United States Patent Office 3,364,774
Patented Jan. 23, 1968

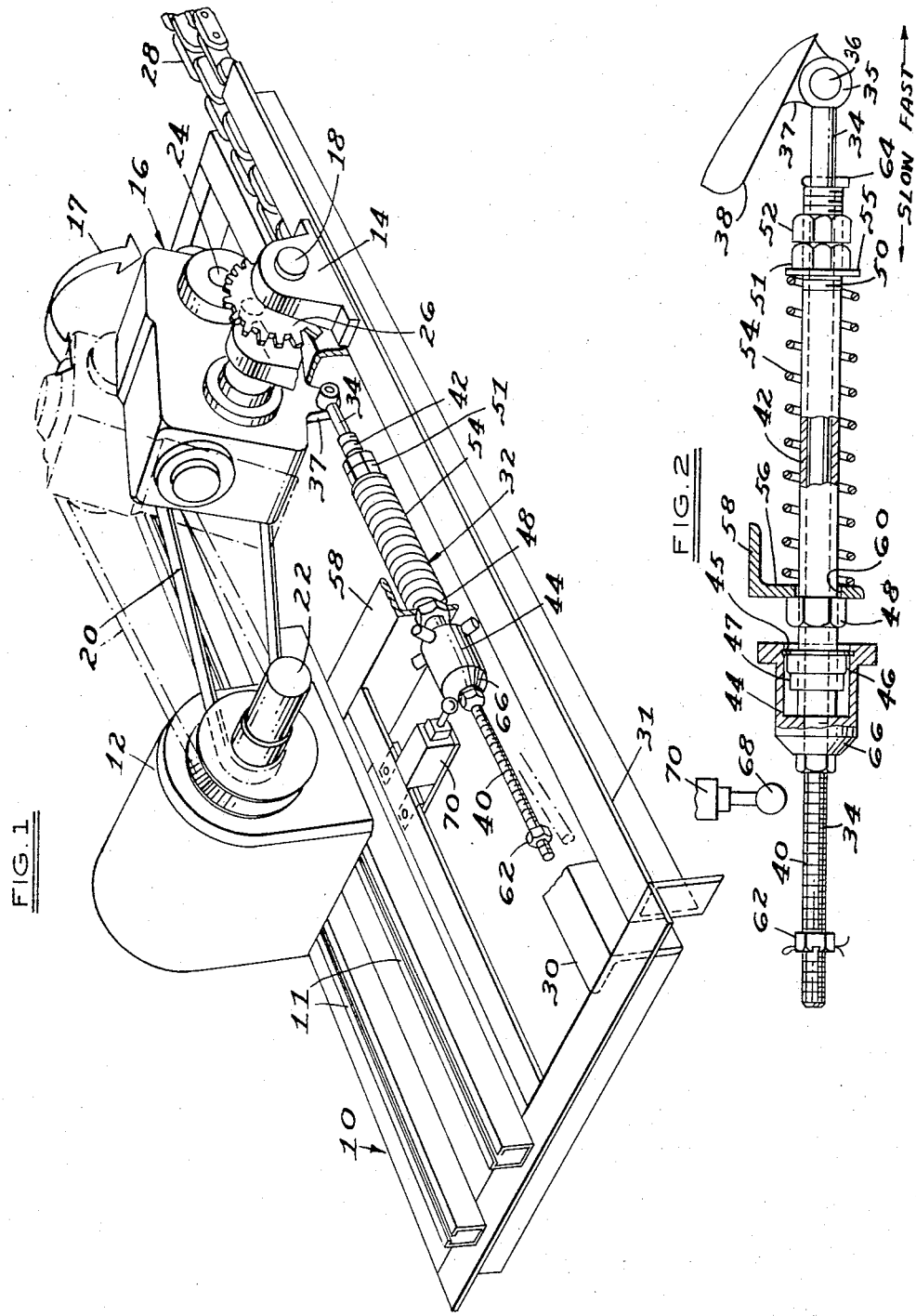

3,364,774
SPEED CONTROL DEVICE FOR CONVEYOR DRIVES
Roland P. Jones, Wayne, Mich., assignor to Jervis B. Webb Company, a corporation of Michigan
Filed Feb. 1, 1966, Ser. No. 524,229
10 Claims. (Cl. 74—424.8)

ABSTRACT OF THE DISCLOSURE

A speed control device connected to a reducer of a drive unit for controlling movement thereof relative to a drive motor, such movement being used to change the output speed of the unit. The device includes an arm adjustably carried by a sleeve for speed changing by varying the effective length of the arm. The sleeve is secured to the drive unit frame by means including a spring permitting movement of the arm relative to the frame for decreasing the output speed in the event the output torque exceeds the spring setting.

---

This invention relates to an improved device for use with drive units, particularly the type of drive units employed for conveyors, for changing the output speed, for reducing the output speed in the event of an overload condition at any speed setting, and for stopping the drive in the event of an excessive overload at any speed setting.

A drive of the type to which the invention is applicable includes at least one component mounted so as to be movable in response to a change in output torque. An example of such a drive unit includes a motor and reducer mounted on a frame with the reducer free to pivot about its outlet shaft; a variable pulley drive connects the output shaft of the motor with the input shaft of the reducer which is displaced radially from the axis of the reducer output shaft; hence pivotal movement of the reducer about its output shaft varies the distance between the reducer input shaft and motor with a corresponding variation in the ratio of the variable pulley drive. In a drive unit of this type a variable length arm has been used to fix the position of the reducer, so that the speed of the reducer output shaft can be regulated by changing the length of the arm.

The present invention provides an improved speed controlling device for a drive unit of this type, and consists of an arm pivotally connected to the reducer at a location spaced radially from the center of the reducer output shaft and extending through a reaction member of the drive unit frame, a sleeve slidably mounted on the arm, an adjusting nut rotatably mounted on the sleeve and having threaded engagement with the arm, and means for positioning the sleeve relative to the reaction member including resilient means opposing relative motion between the sleeve and the reaction member in at least one direction longitudinally of the arm.

Preferably the means for positioning the sleeve relative to the reaction member consists of an abutment on the sleeve engaging the reaction member to limit movement of the sleeve and arm in a direction such as to produce an increase in speed of the drive unit output shaft; the resilient means comprises a spring mounted on the sleeve and engaging the reaction member to oppose motion of the arm and sleeve in the direction of decreasing output speed. The spring is preloaded to absorb a normal amount of driving reaction throughout a desired speed range; if the driving reaction or in other words the output torque of the reducer increases above this setting the spring will be compressed and the effective length of the arm between the reaction member and reducer will be decreased with an accompanying decrease in speed.

In the preferred construction the output speed of the drive can be changed by rotating the adjusting nut to displace the arm relative to the sleeve and change the effective length of the arm between the reaction member and reducer; the maximum output torque of the reducer at any speed setting can be established by the characteristics of the spring selected and the amount of preloading employed; and the maximum overload permissable can be established by mounting an overload sensing device in the path of movement of the sleeve or arm when the spring is compressed under overload.

Other features and advantages of the invention will appear from the following description of the representative embodiment thereof disclosed in the accompanying drawings in which:

FIGURE 1 is a perspective view of a drive unit of the type described above with the speed control device of the invention installed thereon; and FIGURE 2 is an elevation of the speed control device, partly shown in section.

Referring to FIG. 1, the drive unit includes a suitable supporting frame 10 including members 11 on which a motor 12 is bolted, and bearings 14 which support a gear box or reducer 16 on its output shaft 18 so that the reducer is free to pivot in the bearings 14 about the axis of the output shaft 18. A conventional variable ratio pulley drive 20 connects the output shaft 22 of the motor 12 and the input shaft 24 of the reducer 16. Since the input shaft 24 of the reducer is spaced radially from the output shaft 18 thereof, pivotal movement of the reducer in the bearings 14 changes the distance between the center of the motor output shaft 22 and reducer input shaft 24 which produces a corresponding change in the overall ratio of the variable pulley drive 20 and a change in the speed of the output shaft of the reducer on which a sprocket 26 is mounted. The sprocket 26 may form part of a means for driving a conveyor chain 28, travelling in the channel defined between the members 30 and 31 of the drive unit frame 10.

The speed control device of the invention, generally indicated by the reference 32, regulates the pivotal movement of the reducer 16, indicated by the arrow 17, about the reducer output shaft 18. Referring also to FIG. 2, the device 32 consists of an arm 34 having one end 35 pivotally connected to a pin 36 on an ear 37 of the reducer casing 38, and the other end provided with a threaded portion 40. A sleeve 42 slidably engages a portion of the arm 34. An adjusting nut 44 engages the threaded portion 40 of the arm 34 and is rotatably mounted on a thrust bearing 46 carried by the sleeve 42, the bearing being positioned between a thrust washer 47 fixed to the sleeve 42 and a retainer 45 on the nut 44. A positioning collar 48 is also fixed to the sleeve 42, and the sleeve is provided with a threaded end portion 50 to receive tensioning and lock nuts 51 and 52 for a coil spring 54 which surrounds the sleeve and extends between a washer 55 and a surface 56 on a reaction member 58 which forms a part of the fixed frame structure 10, and which is provided with a hole 60 through which the sleeve 42 and arm 34 extend.

The adjusting nut 44, being threaded to the arm 34 and rotatable on the sleeve 42, fixes the position of the arm 34 in the sleeve 42. When the device is installed, the position of the sleeve relative to the fixed reaction member 58, is established by the combination of the collar 48 and spring 54. With the sleeve positioned in this manner relative to the reaction member 58, it will be seen that the effective length of the arm 34—that is, the length between the reaction member 58 and pivot 36 on the reducer case—can be varied by turning the adjusting nut 44 in either direction so as to increase or decrease the effective length of the arm 34.

The device illustrated is constructed and arranged so that an increase in the effective length of the arm causes an increase in the speed of the reducer output shaft 18; and conversely a decrease in the effective length of the arm results in a decrease of output speed of the reducer. Maximum speed is limited by a nut 62 fixed on the threaded portion 40 of the arm 34 to abut against the adjusting nut 44 and limit further extending motion of the arm 34; minimum speed is limited by a pin 64 installed on the arm 34 adjacent the end 35 thereof for abutting engagement with the end of the sleeve 42.

With the device installed and the drive operating, the reaction to the output torque of the reducer shaft 18 and sprocket 26 in driving the chain 28 tends to produce a clockwise rotation of the reducer 16 on the output shaft 18 and move the arm 34 and sleeve 42 to the left as the parts are shown in FIGS. 1 and 2. This movement of the arm and sleeve is resisted by the spring 54 which is preloaded by the nuts 51 and 52 to resist a normal amount of output torque, and this setting or preloading of the spring 54 remains constant throughout the speed range. In other words if the speed of the drive unit is changed by turning the adjusting nut 44 to vary the effective length of the arm 34, this does not change the position of the sleeve 42 and spring 54. If the load on the reducer drive sprocket 26 should increase beyond the normal torque setting, the force of the spring 54 will be overcome and the arm 34 and sleeve 42 will move to the left an amount proportional to the overload. This movement may be used to shut off the motor 12 through a cam surface 66 on the adjusting nut 44 engaging the actuating arm 68 of a limit switch 70.

If more than one drive unit of the type shown is employed to propel a single chain 28 the speed control device of the invention serves to balance the load between drives as well as to provide overload protection. Should one drive become overloaded, the spring 54 of the speed control device will be compressed and the effective length of the arm 34 will decrease permitting the drive to slow down. Any other drive on the chain 28 running at a normal speed which is now faster than the speed of the overloaded drive, will take more of the load and thus relieve the overloaded drive. As the overloaded condition is thus relieved, the speed control device will gradually return the overloaded drive to normal speed by action of the spring 54.

To summarize, the single relatively simply constructed speed control device of the invention performs the multiple functions of changing the overall speed of the drive unit between minimum and maximum limits; setting a normal output torque for the drive at any speed within the speed range which torque setting can be adjusted as desired; reducing the output speed in the event the normal torque setting is exceeded, or in other words the drive is overloaded; stopping the drive in the event the overload reaches a certain amount as determined by the position of the overload sensing limit switch 70; and automatically balancing the load between multiple drives acting on a single driven member such as a conveyor chain.

While preferred embodiments have been described above in detail, it will be understood that numerous modifications might be resorted to without departing from the scope of the invention as defined in the following claims.

I claim:

1. A speed control device for a drive of the type including a driving component mounted for movement on a supporting frame in response to a change in the output torque, together with means for varying the output speed as a function of the relative position between said movable driving component and a fixed reaction member, the speed control device comprising an arm having one end secured to the driving component, and means for adjustably positioning the arm relative to the reaction member including an adjusting nut threaded on the arm, a spring engaging the reaction member, and means interconnecting the adjusting nut and spring whereby a change in the effective length of the arm in a direction of decreasing output speed is opposed by the spring.

2. A speed control device as claimed in claim 1 wherein the means interconnecting the adjusting nut and spring comprises a sleeve slidably mounted on the arm, and means for rotatably mounting the adjusting nut on the sleeve.

3. A speed control device as claimed to claim 2 wherein the means rotatably mounting the adjusting nut on the sleeve includes a recess formed in the adjusting nut, a bearing mounted in said recess and engaging the sleeve, and a thrust collar on the sleeve adjacent the bearing.

4. A speed control device as claimed in claim 1 wherein the means interconnecting the adjusting nut and spring comprises a sleeve slidably mounted on the arm and extending through an aperture in the reaction member, the said spring being mounted on the sleeve, means on the sleeve for preloading the spring against the reaction member including a positioning collar secured to the sleeve for engagement with the reaction member to limit relative movement between the sleeve and reaction member in one direction, the spring engaging and being compressed against the reaction member in the opposite direction by a threaded member on the sleeve.

5. A speed control device as claimed in claim 4 further including means for limiting relative movement between the adjusting nut and sleeve and the arm.

6. A speed control device as claimed in claim 1 further including a sensing element and means for actuating the sensing element in response to a change in the effective length of the arm.

7. A speed control device as claimed in claim 6 wherein the means for actuating the sensing element comprises a cam surface on the adjusting nut.

8. A speed control device for a drive of the type including a driving component mounted for movement on a supporting frame in response to a change in the output torque, together with means for varying the output speed as a function of the relative position between said movable driving component and a fixed reaction member, the speed control device comprising an arm having one end secured to the driving component, a sleeve slidably engaging the arm, an adjusting nut rotatably mounted on the sleeve and having threaded engagement with the arm, and means for positioning the sleeve relative to the reaction member including resilient means opposing relative motion between the sleeve and reaction member in at least one direction longitudinally of the arm.

9. A speed control device as claimed in claim 8 wherein the means for positioning the sleeve relative to the reaction member includes a thrust abutment on the sleeve for engaging the reaction member upon relative motion between the sleeve and reaction member in one direction, the resilient means comprising a spring mounted on the sleeve for engagement with the reaction member and with a collar adjustable longitudinally of the sleeve whereby the spring opposes relative motion in the other direction to an extent in part proportional to the setting of the adjustable collar.

10. A speed control device as claimed in claim 9 further including a sensing element mounted on the drive supporting frame, and cam means carried by the sleeve for actuating the sensing element in response to relative movement between the sleeve and reaction member.

References Cited

UNITED STATES PATENTS

| | | | |
|---|---|---|---|
| 2,180,679 | 11/1939 | Heyer | 74—230.17 |
| 2,894,406 | 7/1959 | Rampe | 74—230.17 |
| 3,301,077 | 1/1967 | Caughlin | 74—230.17 |

DONLEY J. STOCKING, *Primary Examiner.*

L. H. GERIN, *Assistant Examiner.*